United States Patent [19]

Gebert et al.

[11] Patent Number: 5,245,334
[45] Date of Patent: Sep. 14, 1993

[54] TRAFFIC DETECTION CABLE INSTALLATIONS

[76] Inventors: Franz J. Gebert; Rüdiger H. Gebert; Ralf D. Gebert, all of Unter den Ulmen 16, 4100 Duisburg 12, Fed. Rep. of Germany

[21] Appl. No.: 540,346

[22] Filed: Jun. 19, 1990

[51] Int. Cl.⁵ .............................................. G08G 1/01
[52] U.S. Cl. ...................................... 340/933; 340/934; 340/936; 340/939; 404/22; 116/63 R
[58] Field of Search .............. 340/933, 934, 936, 939; 404/9, 22, 17; 116/63 R

[56] References Cited

U.S. PATENT DOCUMENTS

| | | | |
|---|---|---|---|
| 3,906,492 | 9/1975 | Narbaits-Jaureguy et al. | 340/933 |
| 3,983,531 | 9/1976 | Corrigan | 340/936 |
| 4,383,239 | 5/1983 | Robert | 340/933 |
| 5,008,666 | 4/1991 | Gebert et al. | 340/933 |

FOREIGN PATENT DOCUMENTS

| | | | |
|---|---|---|---|
| 8600475 | 9/1987 | Netherlands | 340/933 |
| 2084774 | 4/1982 | United Kingdom | 340/933 |

*Primary Examiner*—Jin F. Ng
*Assistant Examiner*—Nina Tong
*Attorney, Agent, or Firm*—Ladas & Parry

[57] ABSTRACT

An installation of traffic detection cables adapted for sub-surface mounting or adapted for top surface mounting which comprises a moulding of prismatic type, that is having the substantially same cross sectional shape extending longitudinally in which two detection cables are embedded, in which the cables are separated to reduce to acceptable levels or levels which can be handled by suitable electronic circuitry or logic signal processing cross cable interference effects when an impulse is applied to the profile by passage of the vehicle wheels. A void or plate can separate the cables in a matrix of about 85 Shore hardness.

5 Claims, 2 Drawing Sheets

TRAFFIC DETECTION CABLE INSTALLATIONS

BACKGROUND OF THE INVENTION

1. Field of the invention

This invention relates to traffic detection cable installations, that is means of installing detection cables for traffic monitoring. A typical area of application of the invention is in connection with traffic detector cables extended across roads.

The invention in principle can, however, also be employed in other aspects for example on vehicle runways, aircraft carrier take-off pads and in principle any other application where such detection or similar detection will be required.

2. Description of Prior Related Art

The installation of cables for traffic monitoring presents difficult problems. Traditionally the cables have been stretched across the road surface but the deterioration of cables in service under these conditions can be exceptionally rapid, for example, in dense traffic only a matter of hours, and moreover unpredictable, being dependent upon traffic conditions, speeds of travel and other factors which are difficult to predict.

Subsurface mounting of detectors in copper tubes or embedded in channels has been tried, but problems encountered have limited the success achieved.

SUMMARY OF THE INVENTION

Means for installation of traffic detection cables in accordance with this invention adapted for sub-surface mounting in a first aspect thereof provides a moulding of prismatic type, that is having the substantially same cross sectional shape extending longitudinally (as for example in the case of an extrusion) in which two detection cables are embedded.

The cables may be embedded side by side, that is of the same depth below the upper surface of the profile in use, or the cables may be embedded one above the other.

In either event the cables are separated to reduce to acceptable levels and/or levels which can be handled by suitable electronic circuitry and/or logic signal processing cross cable interference effects when an impulse is applied to the profile by passage of the vehicle wheels.

This separation may be achieved merely by a sufficient space between the detection cables.

The profile may further be especially adapted to minimise or specially reduce such cross cable interference effects, for example, by the provision of a void space between the cables or an insert of a rigid material between the cables or a rigid insert presenting two parallel longitudinally extending channels in which the material of the profile is provided encapsulating the cable.

Preferably the material of the profile is selected to have an elasticity of a suitable kind for detection of impulses with minimal cross cable intereference.

The material preferably has a Shore hardness of more than 65, more preferably approximately 85.

It is desirable that the cables be presented at a depth from the upper surface of the profile in use which is equal to or more than the depth to which that upper surface of the profile is adapted to be proud of the surrounding road surface in the installation. In this way if snow ploughs move over the surface of a road, for example, and shave off the upper portion of the profile the detection cables will not be ripped up or unduly exposed. Preferably, however, the cables are not located near the bottom of the profile but preferably as near as possible to the upper surface of the profile having regard to the limitation referred to. In this way the sensitivity of response of the cable is optimised.

As an alternative arrangement in accordance with this invention the paired cables are provided in physically separate profiles adapted to be installed alongside each other, the profiles made interlocking so that they can be brought together and installed interlocked at a reliably established spacing from each other. In this way mechanical interference can be minimised. The manner of interlocking of two cables in profiles along each side of each other can be adapted with this requirement in view. For example polyurethane is a suitable material given the correct specification of elasticity.

A top surface application in accordance with this invention can either be portable or fixed as will be described in detail below. In accordance with this invention a top surface means for installation of detector cables comprises a longitudinally extended prismatic profile in which two cables are embedded, sufficiently separated from each other to reduce intercable interference to negligible levels and/or levels which can be handled by suitable electronic circuitry and/or logic signal processing from the cables, the profile adapted to be placed on a surface and to allow the passage of vehicles of any kind over it at the surface.

The material of the profile has a sufficient resilience for the transmission of impulses to the embedded cables.

The profile may be of D profile in shape, the flat surface adapted for resting on a road or other surface and the curved surface for the passage of vehicles over it. Any other profile may be adapted as required including an angular profile approximately to a D profile.

The profile may be provided with longitudinally extending connecting formations to permit a comparably formed profile to be attached to it.

In accordance with another embodiment of this invention a profile is provided which includes a single cable embedded in it extending longitudinally in the longitudinally extended profile and adapted at one edge at least or both longitudinal extending edges for joining with a coacting cable profile containing one or two embedded cables.

The embedded cables may be piezo-electric, exhibiting a resistive and/or generative piezo-electric response, triboelectric or exhibit any other effect including capacitance based effects upon the receipt of a mechanical impulse and/or a physical strain associated with the impulse or stress field generated by the impulse.

For example such profiles can be provided in a spaced parallel array for speed detection at a distance which is suitable for speed detection purposes.

As is known the double cables provided can be used in a duplicated measurement system as is prescribed by law in certain countries and is the practice in several others to provide legally sufficient proof of the breaking of speed limits for law enforcement purposes.

In accordance with a preferred embodiment of the invention there is a preferred array of profiles comprising three parallel spaced apart profiles, the first one to serve as a start cable for measurement, the second one to serve as a stop cable for that first measurement and simultaneously as a start cable for a second duplicated and confirmation measurement and a third cable to provide the stop signal for the second confirmation measurement.

BRIEF DESCRIPTION OF THE DRAWINGS

The invention will be more fully described by way of examples with reference to the accompanying drawings in which various arrays of cables are shown with the embedded cables, in which.

DESCRIPTION OF THE PREFERRED EMBODIMENTS

Figure 1:
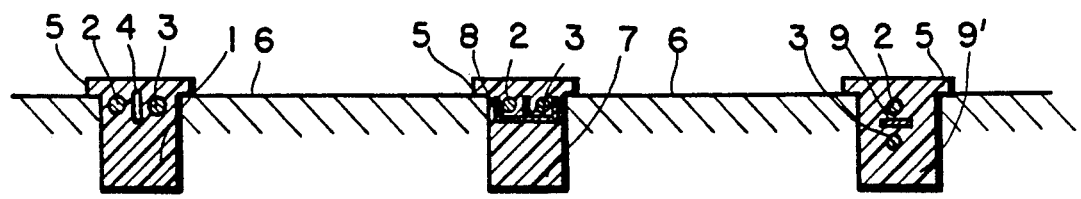
FIG. 1 is a schematic longitudinal cross section through a road showing a sub-surface mounting.

FIG. 1 shows three different profiles set in a road. The first profile 1 has two cables 2 and 3 located alongside each other at the same horizontal height, a void space 4 between them in the profile to eliminate cross cable interference. The profile is of T shape, the upper cross bar 5 of the T being proud of the road surface 6. The cables 2 and 3 are a distance below the top of the profile slightly more than the thickness of the bar 5 to reduce their exposure to damage.

The profile 7 has extruded aluminium moulding 8 embedded in it and containing the cables which are again designated 2 and 3, other features being marked with the same reference numerals and being similar.

Again the profile, 9' has two cables again marked 2 and 3 but this time mounted one above the other and with simple metal strip 9 between them to eliminate inter-cable interference. Again other features have the same reference numerals and correspond with the description of the first profile 1.

Figure 2:
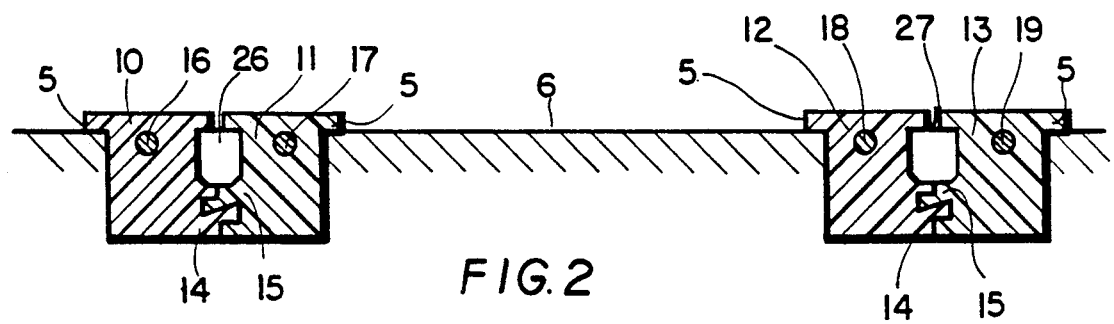
FIG. 2 is a schematic longitudinal cross section through a road showing a sub-surface mounting.

FIG. 2 shows an array of two paired sets of extruded profiles 10, 11 and 12, 13 each having interlocking formations 14 and 15 to keep them together. Interference-reducing means 26,27 between the interlocking means for reducing cross-cable interference effects between the cables 16,17 and 18,19. One cable 16, 17, 18 and 19 respectively in each part of each extruded pair.

Figure 3:
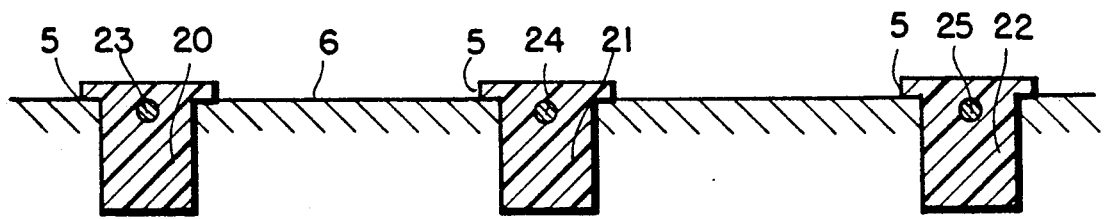
FIG. 3 is a schematic longitudinal cross section through a road showing a sub-surface mounting.

FIG. 3 shows an array of three extrusions 20, 21 and 22 each containing a cable 23, 24 and 25 respectively. The array is so set up that cable 23 is a start cable for the first measurement, cable 24 a stop cable for the first measurement and a start cable for a second measurement and cable 25 a stop cable for the second measurement.

Figure 4:
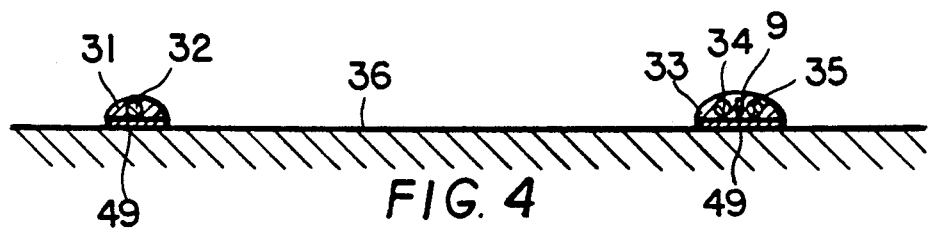
FIG. 4 is a schematic longitudinal cross section through a road showing a top surface embedded mounting.

As shown in FIG. 4 there is provided an array comprising a longitudinally extending profile 31 having a single cable 32 in it and in a spaced parallel relationship to it a longitudinally extending profile 33 having two cables 34 and 35 embedded in it. These are placed on a road surface 36 and for example they may be tensioned on a road surface and optionally in addition or instead also bonded to the road surface by use of a suitable bonding material or glue or adhesive suitably adapted to the nature of the road surface. The base of the profile may be reinforced by the embedment of sheet material such as sheet metal and/or polymeric sheets or fibrous mats or webs, both polymeric textile webs or bands or belts and metallic woven webs or bands or belts. It is desirable to preserve the facility for this article to be rolled up and thereby stored conveniently.

It may be noted in the experience of the applicant that in certain traffic conditions unprotected piezo-electric cables stretched over a road surface cannot be relied upon to last a long time and may last a quite variable period between a few hours, a few days to a few weeks or in favourable conditions significantly longer. It is thus an object of this invention to provide a better installation of surface cables.

Figure 5:
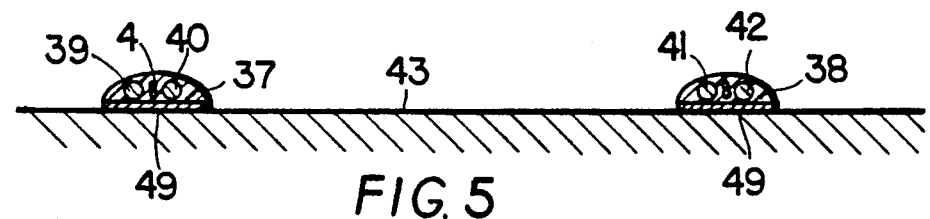
FIG. 5 is a schematic longitudinal cross section through a road showing a top surface embedded mounting.

FIG. 5 shows profiles 37 and 38 each containing embedded cables 39, 40, 41, and 42 respectively and in a spaced array on a road surface 43. This duplication of cables can provide for the duplication of speed readouts as is required in certain jurisdictions for evidential verification for speed law enforcement purposes.

Figure 6:
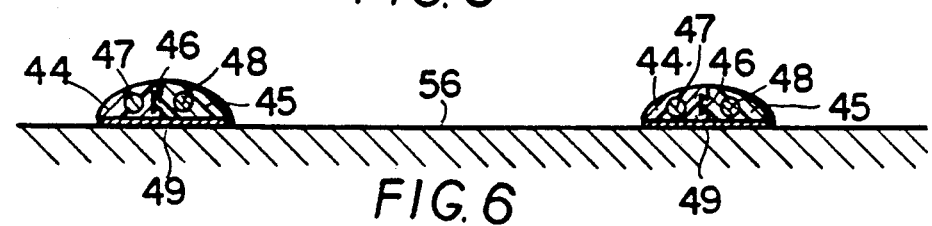
FIG. 6 is a schematic longitudinal cross section through a road showing a top surface embedded mounting.

FIG. 6 shows special profiles in accordance with the invention in a spaced array each comprising a profile sub-unit 44 and a profile sub-unit 45 which have interlocking formations along one longitudinally extending edge which are shown here interlocked as at 46, each profile sub-unit containing an embedded cable 47 and 48 respectively. Again reinforcing foils, belts, webs, textiles or bands 49 can be provided as shown in all figures.

Figure 7:
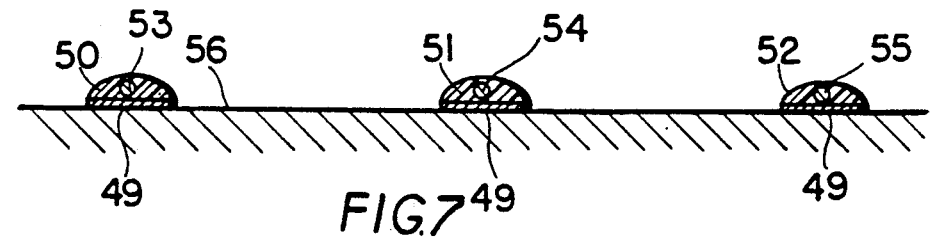
FIG. 7 is a schematic longitudinal cross section through a road showing a top surface embedded mounting.

FIG. 7 shows an array in accordance with the invention comprising three profiles 50, 51 and 52 each having a single cable 53, 54 and 55 respectively embedded in it. The cable 53 is wired as a start cable and the cable 54 as a stop cable related to the start cable 53 and simultaneously as a start cable and a cable 55 as a stop cable related to the start function of the cable 54. The road surface 56 is shown in FIGS. 6 and 7.

Figure 8:
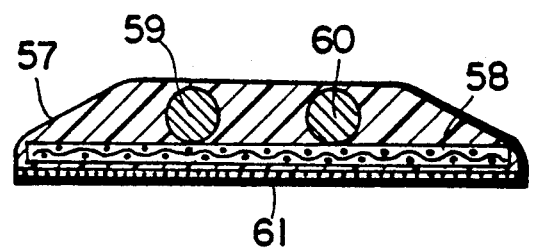
FIG. 8 is a schematic longitudinal cross section through a road showing a top surface embedded mounting.

FIG. 8 shows on an enlarged scale a profile 57 having an embedded textile belt 58 and two piezo-electric cables 59 and 60 of coaxial type. An adhesive 61 is provided on the lower surface for gluing to the road.

We claim:

1. Means for installation of traffic detection cables adapted for sub-surface mounting which comprises a moulding a prismatic type, that is having the substantially same cross sectional profile extending longitudinally in which two detection cables are embedded, in which the cables are separated by means to reduce cross cable interference effects to levels which can be processed by one selected from electronic circuitry and logic signal processing when an impulse is applied to the profile by passage of vehicle wheels, in which the paired cables are provided in physically separate interlocking profiles installed alongside each other.

2. Means for installation of traffic detection cables adapted for sub-surface mounting which comprises a moulding of prismatic type, that is having the substantially same cross sectional profile extending longitudinally in which two detection cables are embedded, in which the cables are separated by means to reduce cross cable interference effects to levels which can be processed by one selected from electronic circuitry and logic signal processing when an impulse is applied to the profile by passage of vehicle wheels, further comprising means provided in an array of profiles comprising three parallel spaced apart profiles, the first one to serve as a start cable for measurement, the second one to serve as a stop cable for the first measurement and simultaneously as a start cable for a second duplicated and confirmation measurement and a third cable to provide a top signal for the second confirmation measurement.

3. Means for installation of traffic detection cables adapted for sub-surface mounting which comprises a moulding of prismatic type, that is having the substantially same cross sectional profile extending longitudinally in which two detection cables are embedded, in which the cables are separated by means to reduce cross cable interference effects to levels which can be processed by one selected from electronic circuitry and logic signal processing when an impulse is applied to the profile by passage of vehicle wheels, further comprising means adapted to reduce or minimize cross cable interference effects by means of one selected from a void and a rigid insert embedded between the cables the void being a void space containing air and the rigid insert is totally embedded and unattached to any outer surface of the profile.

4. Means for installation of traffic detection cables adapted for top surface application which comprises a moulding of prismatic type, that is having the substantially same cross sectional profile extending longitudinally, in which the cables are separated by means to reduce cross cable interference effects to levels which can be processed by one selected from electronic circuitry and logic signal processing when an impulse is applied to the profile by passage of vehicle wheels the profile having a flat base adapted to be placed on the surface and to allow the passage of vehicles of any kind over it at the surface further comprising means adapted to reduce or minimize cross cable interference effects by means of one selected from a void and a rigid insert embedded between the cables the void being a void space containing air and the rigid insert is totally embedded and unattached to a base reinforcement and an adhesive on the lower surface.

5. In a traffic detection cable system comprising an elongated prismatic housing for mounting one of on top of a surface and sub-surface and a first and a second cable extending along the housing for providing a signal to one end of at least one of the first and second cables in response to passage of a vehicle on the surface across the housing, the improvement comprising:
a first elongated prismatic housing portion for housing the first cable;
a second elongated prismatic housing portion for housing the second cable;
interlocking means cooperative between the first and second housing portions for interlocking the first and second housing portions alongside each other; and
interference-reducing means between the first and second housing portions when the first and second housing portions are interlocked for reducing cross-cable interference effects between the first and second cables.

* * * * *